United States Patent
Huang-Fu et al.

(10) Patent No.: US 11,445,401 B2
(45) Date of Patent: Sep. 13, 2022

(54) SESSION MANAGEMENT IN WIRELESS COMMUNICATION SYSTEM

(71) Applicant: MEDIATEK INC., Hsinchu (TW)

(72) Inventors: Chien-Chun Huang-Fu, Hsinchu (TW); Yu-Chieh Tien, Hsinchu (TW); Chi-Hsien Chen, Hsinchu (TW); Shang-Ru Mo, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/795,421

(22) Filed: Feb. 19, 2020

(65) Prior Publication Data
US 2020/0275305 A1     Aug. 27, 2020

Related U.S. Application Data

(60) Provisional application No. 62/808,936, filed on Feb. 22, 2019.

(51) Int. Cl.
| | |
|---|---|
| *H04W 28/12* | (2009.01) |
| *H04W 28/02* | (2009.01) |
| *H04W 80/10* | (2009.01) |
| *H04W 76/25* | (2018.01) |

(52) U.S. Cl.
CPC ....... *H04W 28/0268* (2013.01); *H04W 28/12* (2013.01); *H04W 76/25* (2018.02); *H04W 80/10* (2013.01)

(58) Field of Classification Search
CPC . H04W 28/0268; H04W 80/10; H04W 76/25; H04W 28/12; H04W 76/11; H04W 76/22
See application file for complete search history.

(56) References Cited

U.S. PATENT DOCUMENTS

| | | |
|---|---|---|
| 9,596,635 B2 | 3/2017 | Park et al. |
| 2010/0034154 A1 | 2/2010 | Tanigawa et al. |
| 2014/0293964 A1 | 10/2014 | Park et al. |

(Continued)

FOREIGN PATENT DOCUMENTS

| | | |
|---|---|---|
| CN | 101518138 A | 8/2009 |
| WO | WO 2013/066074 A1 | 5/2013 |
| WO | WO 2019/033901 A1 | 2/2019 |

OTHER PUBLICATIONS

3GPP ("Handling errors due to missing QoS flow descriptions parameters for GBR QoS flows", 3GPP TSG-CT WGl Meeting #113, Qualcomm Incorporated, MediaTek Inc, Ericsson, CI-188970), Nov. 2018.*

(Continued)

*Primary Examiner* — Lakeram Jangbahadur
(74) *Attorney, Agent, or Firm* — Oblon, McClelland, Maier & Neustadt, L.L.P.

(57) ABSTRACT

A method can include receiving a non-access stratum (NAS) message for establishing or modifying a protocol data unit (PDU) session at a user equipment (UE) from a core network, determining whether there is a quality of service (QoS) flow description resulting from the establishment or modification of the PDU session that is associated with a guaranteed bit rate (GBR) QoS flow of the PDU session, and invalid, and when it is determined that there is the invalid QoS flow description associated with the GBR QoS flow of the PDU session, performing an error handling operation.

12 Claims, 12 Drawing Sheets

(56) References Cited

U.S. PATENT DOCUMENTS

| | | | |
|---|---|---|---|
| 2019/0028920 A1* | 1/2019 | Pan | H04L 47/24 |
| 2019/0116518 A1* | 4/2019 | Stojanovski | H04W 28/0257 |
| 2019/0253917 A1* | 8/2019 | Dao | H04L 12/1407 |
| 2020/0100156 A1* | 3/2020 | Liu | H04W 76/22 |
| 2020/0112907 A1* | 4/2020 | Dao | H04W 48/06 |
| 2020/0187043 A1* | 6/2020 | Xin | H04M 15/66 |
| 2020/0389810 A1* | 12/2020 | Wang | H04W 28/0268 |

OTHER PUBLICATIONS

3GPP112 (PDU Session Release due to Semantic or Syntactical Errors, 3GPP Meeting #112, C1-185828), Aug. 2018.*

Liu (U.S. Appl. No. 62/734,017), filed Sep. 2018.*

English translation of the International Search Report and Written Opinion of the International Searching Authority dated May 8, 2020 in PCT/CN2020/076139, 9 pages.

"Handling Errors due to Missing QoS Flow Descriptions Parameters for GBR QoS Flows" 3GPP TSG-CT WG1 Meeting #113, Qualcomm Incorporated, MediaTek Inc, Ericsson, C1-188970, Dec. 14, 2018, 9 pages.

Combined Taiwanese Office Action and Search Report dated Oct. 30, 2020 in Patent Application No. 109105452 (with English translation of Category of Cited Documents), 9 pages.

Qualcomm Incorporated, et al., "Handling errors due to missing QoS flow descriptions parameters for GBR QoS flows," 3GPP TSG-CT WG1 Meeting #113, C1-188939, [URL: https://portal.3gpp.org/ngppapp/CreateTDoc.aspx?mode=view&contributionUid=C1-188970], Nov. 2018, 9 pages.

Chinese Office Action and Search Report dated Apr. 1, 2022 in Chinese Application No. 202080001508.7, 12 pgs.

"5G QoS—restructuring QoS rules IE", Ericsson. Mediatek Inc., Qualcomm Incorporated, (3GPP TSG-CT WG1 Meeting #111, C1-183815), May 25, 2018, 28 pgs.

* cited by examiner

QOS FLOW DESCRIPTIONS INFORMATION ELEMENT

| |
|---|
| QOS FLOW DESCRIPTIONS IE IDENTIFIER |
| LENGTH OF QOS FLOW DESCRIPTIONS CONTENTS |
| QOS FLOW DESCRIPTION 1 |
| QOS FLOW DESCRIPTION 2 |
| ... |
| QOS FLOW DESCRIPTION n |

FIG. 8

QOS FLOW DESCRIPTION PARAMETER

| 0 SPARE | 0 SPARE | QOS FLOW IDENTIFIER (QFI) | | | | |
|---|---|---|---|---|---|---|
| OPERATION CODE | | 0 SPARE | 0 SPARE | 0 SPARE | 0 SPARE | 0 SPARE |
| 0 SPARE | E | NUMBER OF PARAMETERS | | | | |
| PARAMETERS LIST | | | | | | |

FIG. 9

SESSION MANAGEMENT IN WIRELESS COMMUNICATION SYSTEM

INCORPORATION BY REFERENCE

This present application claims the benefit of U.S. Provisional Application No. 62/808,936, "Enhancement QoS flow Description Handling" filed on Feb. 22, 2019, which is incorporated herein by reference in its entirety.

TECHNICAL FIELD

The present disclosure relates to wireless and wired communications, and specifically relates to session management at a user equipment (UE).

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A protocol data unit (PDU) session can be established for transmitting application data packets between a user equipment (UE) and a data network (e.g., the Internet). The PDU session can include QoS flows characterized by QoS rules and QoS flow descriptions. A PDU session modification procedure can be carried out to modify or create QoS rules or QoS flow descriptions to modify the PDU session.

SUMMARY

Aspects of the disclosure provide a method. The method can include receiving a non-access stratum (NAS) message for establishing or modifying a protocol data unit (PDU) session at a user equipment (UE) from a core network, determining whether there is a quality of service (QoS) flow description resulting from the establishment or modification of the PDU session that is associated with a guaranteed bit rate (GBR) QoS flow of the PDU session, and invalid, and when it is determined that there is the invalid QoS flow description associated with the GBR QoS flow of the PDU session, performing an error handling operation.

In an embodiment, the QoS flow description associated with the GBR QoS flow of the PDU session is determined to be invalid when one or more of following parameters are missing from the QoS flow description: guaranteed flow bit rate for uplink (GFBR UL), guaranteed flow bit rate for downlink (GFBR DL), maximum flow bit rate for uplink (MFBR UL), and maximum flow bit rate for downlink (MFBR DL).

In an embodiment, the QoS flow description is determined to be associated with the GBR QoS flow when a 5G QoS identifier (5QI) in the QoS flow description has a GBR resource type or a delay-critical GBR resource type, or when a QoS flow identifier (QFI) in the QoS flow description has a value of a 5QI having a GBR resource type or a delay-critical GBR resource type.

In an embodiment, the NAS message is a PDU session modification command message, or a PDU session establishment accept message indicating an operation of creating or modifying a QoS flow description to provide the invalid QoS flow description associated with the GBR QoS flow of the PDU session.

In an embodiment, the error handling operation includes when the invalid QoS flow description associated with the GBR QoS flow of the PDU session is associated with a default QoS rule of the PDU session, initiating a process to release the PDU session.

In an embodiment, the error handling operation includes when the invalid QoS flow description associated with the GBR QoS flow of the PDU session is not associated with a default QoS rule of the PDU session, performing at least one of deleting the invalid QoS flow description and QoS rules, if any, corresponding to the invalid. QoS flow description, or initiating a PDU session modification process to delete the invalid QoS flow description and the QoS rules, if any, corresponding to the invalid QoS flow description.

In an embodiment, the error handling operation includes indicating a 5G session management (5GSM) cause to the core network. In an embodiment, the NAS message indicates an operation of creating or modifying a QoS flow description to provide the invalid QoS flow description associated with the GBR QoS flow of the PDU session, and the error handling operation includes completing one or more other operations indicated by the NAS message.

Aspects of the disclosure provide another method. The method can include receiving a PDU session modification command message from a core network requesting a flow description operation at a UE during a PDU session modification procedure. When the flow description operation is "create new QoS flow description", or "modify existing QoS flow description", it is determined whether there is a QoS flow description of a guaranteed bit rate (GBR) QoS flow which lacks at least one of mandatory parameters. When it is determined that there is the QoS flow description of the GBR QoS flow which lacks at least one of the mandatory parameters, an error handling operation is performed.

In an embodiment, the error handling operation includes when a default QoS rule of the PDU session is associated with the QoS flow description of the GBR QoS flow which lacks at least one of the mandatory parameters, initiating a PDU session release procedure by sending a PDU session release request message with a 5G session management (5GSM) cause #84, "syntactical error in the QoS operation".

In an embodiment, the error handling operation further includes when there is no default QoS rule associated with the QoS flow description of the GBR QoS flow which lacks at least one of the mandatory parameters, if a QoS rules IE of the PDU session modification command message contains at least one valid QoS rule, or a QoS flow description IE of the PDU session contains at least one other valid QoS flow description, further processing one or more requests corresponding to the at least one valid QoS rule, or the at least one other valid QoS flow description without diagnose an error to trigger a reject to the PDU session modification command message.

In an embodiment, the error handling operation further includes completing the PDU session modification procedure, deleting the QoS flow description which lacks at least one of the mandatory parameters and one or more QoS rules, if any, associated with the QoS flow description which lacks at least one of the mandatory parameters, and initiating a UE requested PDU session modification procedure by sending a PDU session modification request message with the 5G session management (5GSM) cause #84 "syntactical error in the QoS operation" to delete the QoS flow description which lacks at least one of the mandatory parameters and one or more QoS rules, if any, associated with the QoS flow description which lacks at least one of the mandatory parameters.

Aspects of the disclosure provide another method. The method can include receiving a PDU session establishment accept message from a core network requesting a flow description operation at a UE during a PDU session establishment procedure requested by the UE. When the flow description operation is "create new QoS flow description", it is determined whether there is a QoS flow description of a guaranteed bit rate (GBR) QoS flow which lacks at least one of mandatory parameters. When it is determined that there is the QoS flow description of the GBR QoS flow which lacks at least one of the mandatory parameters, an error handling operation can be performed.

In an embodiment, the error handling operation includes when a default QoS rule of the PDU session is associated with the QoS flow description of the GBR QoS flow which lacks at least one of the mandatory parameters, initiating a PDU session release procedure by sending a PDU session release request message with a 5G session management (5GSM) cause #84 "syntactical error in the QoS operation".

In an embodiment, the error handling operation further includes when there is no default QoS rule associated with the QoS flow description of the GBR QoS flow which lacks at least one of the mandatory parameters, initiating a UE requested PDU session modification procedure by sending a PDU session modification request message with the 5G session management (5GSM) cause #84 "syntactical error in the QoS operation" to delete the QoS flow description which lacks at least one of the mandatory parameters and one or more QoS rules, if any, associated with the QoS flow description which lacks at least one of the mandatory parameters.

In an embodiment, the error handling operation includes when there is no default QoS rule associated with the QoS flow description of the GBR QoS flow which lacks at least one of the mandatory parameters, if a QoS rules IE of the PDU session establishment accept message contains at least one valid QoS vile, or a QoS flow description IE of the PDU session contains at least one other valid QoS flow description, further processing one or more requests corresponding to the at least one valid QoS rule, or the at least one other valid QoS flow description.

In an embodiment, the error handling operation includes deleting the QoS flow description which lacks at least one of the mandatory parameters and one or more QoS rules, if any, associated with the QoS flow description which lacks at least one of the mandatory parameters.

BRIEF DESCRIPTION OF THE DRAWINGS

Various embodiments of this disclosure that are proposed as examples will be described in detail with reference to the following figures, wherein like numerals reference like elements, and wherein:

FIG. 8 shows an example of a QoS flow descriptions information element (IE) 800.

FIG. 9 shows an example of a QoS flow description parameter 900 included in a QoS flow descriptions IE.

DETAILED DESCRIPTION OF EMBODIMENTS

Figure 1:
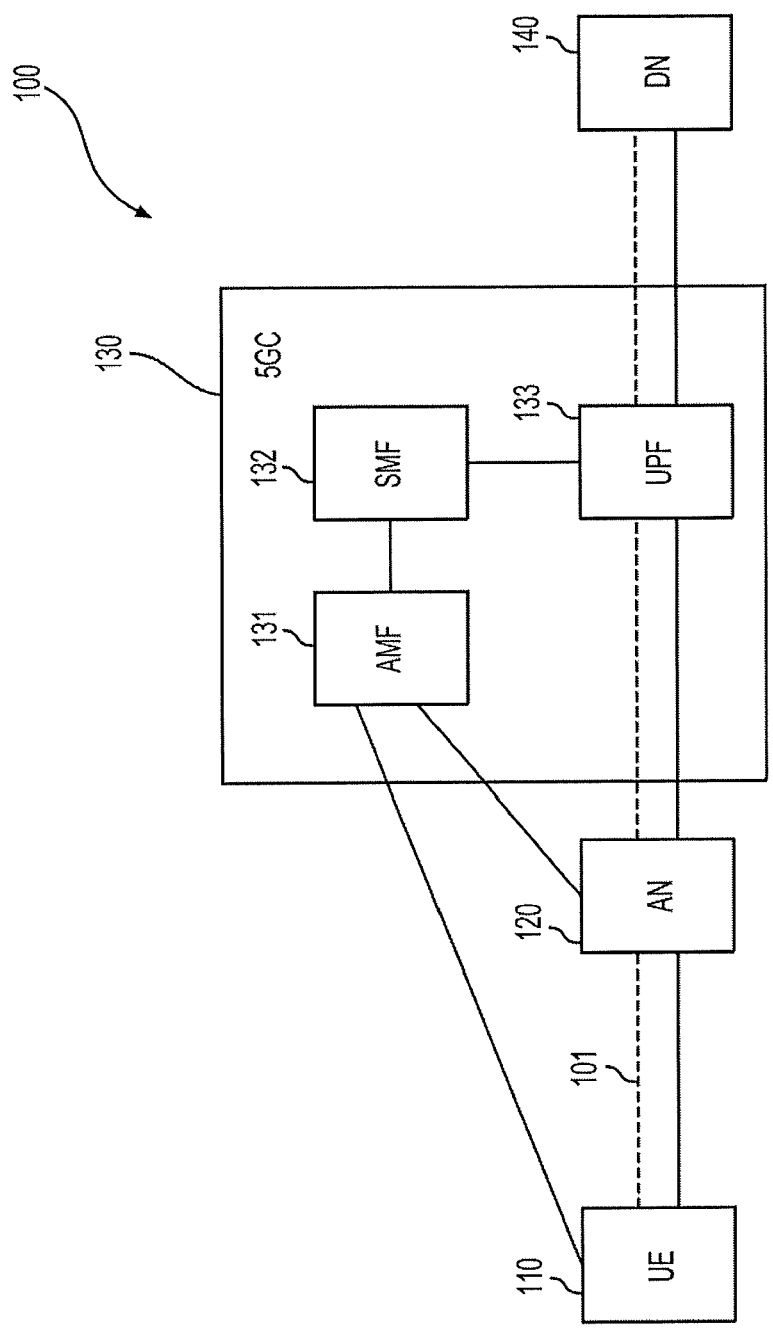
FIG. 1 shows a communication system 100 according to an embodiment of the disclosure.

FIG. 1 shows a communication system 100 according to an embodiment of the disclosure. The system 100 can be a fifth generation system (5GS) that includes a user equipment (110), an access network (AN) (120), a fifth generation core (5GC) 130, and a data network (DN) 140. The 5GC 130 can include an access and mobility management function (AMF) 131, a session management function (SMF) 132, a user plane function (UPF) 133. Those elements are coupled with each other as shown in FIG. 1. Those elements in the system 100 can coordinate with each other to establish, modify, or release a protocol data unit (PDU) session 101 for exchanging data units (e.g., IP packets, Ethernet data frames, unstructured data, and the like) between the UE 110 and the DN 140.

The UE 110 can be a mobile phone, a laptop, a vehicle, and the like. The AN 120 can be a 3rd Generation Partnership Project (3GPP) radio network (e.g., a gNB as specified in 3GPP New Radio standards), or a non-3GPP network (e.g., a Wi-Fi, WiMAX, or fixed network). The 5GC 130 can be a core network as specified in 3GPP 5G standards. The AMF 131 can be configured to forward session management related signaling messages between the SMF 132 and the UE 110 or the AN 120. The SMF 132 is configured to select the UPF 133 and exchange signaling messages with the UE 110, the AN 120, and the UPF 133 to perform session management functions, such as establishment, modification, and release of the PDU session 101.

In operation, 5GS session management (5GSM) processes can be performed over a non-access stratum (NAS) signaling connection between the UE 110 and the AMF 131 for PDU connection handling in the UE 110 and in the SMF

132. For example, a 5GS mobility management (5GMM) protocol can operate between the UE 110 and the AMF 131, and be used as a transport protocol. A 5GSM message of a 5GSM protocol can be piggybacked in a 5GMM transport message. For example, the 5GSM message can be transmitted in an information element (IE) in the 5GMM transport message.

The 5GSM procedures can include a UE-requested PDU session establishment process for establishing a PDU session, a network-initiated PDU session modification process (may be requested by a UE), and a network-initiated PDU session release process (may be requested by a UE).

Figure 2:
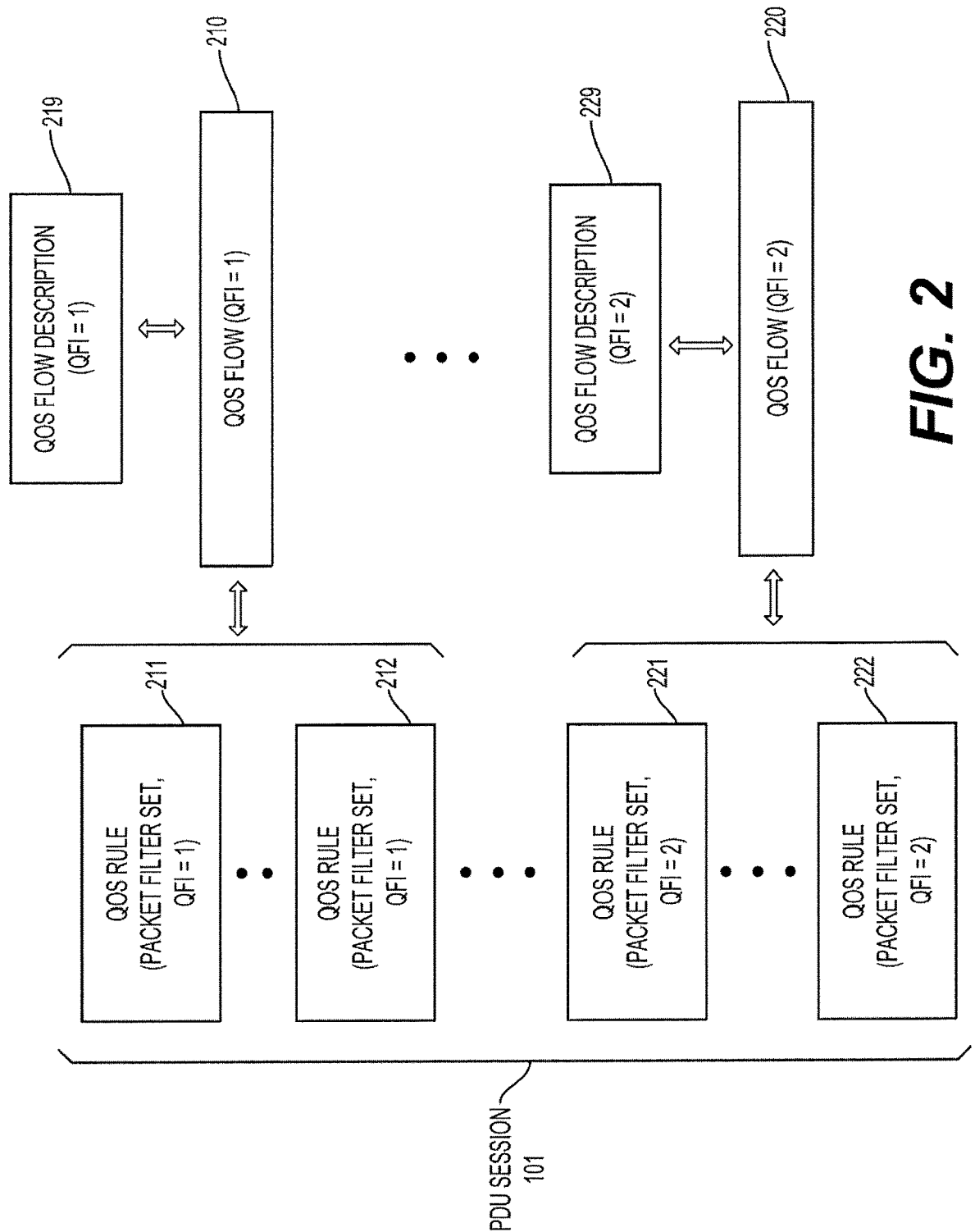
FIG. 2 shows an example of a protocol data unit (PDU) session 101 according to an embodiment of the disclosure.

FIG. 2 shows an example of the PDU session 101 according to an embodiment of the disclosure. The PDU session 101 can be of a PDU session type of IPv4, IPv6, IPv4v6, Ethernet, or the like. The PDU session 101 can include one or more quality of service (QoS) flows 210-220 each having a QoS flow identifier (QFI), and be associated with one or more QoS rules and a QoS flow description. For example, the QoS flow 210 of QFI=1 is associated with QoS rules 211-212, and a QoS flow description 219, while the QoS flow 220 of QFI=2 is associated with QoS rules 221-222, and a QoS flow description 229.

The QoS rules of the PDU session 101 can be signaled from the 5GC 130 when the PDU session 101 is established or modified, or can be derived locally using a reflective QoS scheme. Each signaled QoS rule (e.g., the QoS rules 211-212 and 221-222) can include an indication of whether the QoS rule is a default QoS rule, a QoS rule identifier (QRI), a QFI corresponding to the associated QoS flow, optionally, a set of packet filters (a packet filter set), and a precedence value. The packet filter set can include zero or more packet filters (other than a match-all packet filter) for uplink or downlink. The packet filters are used to classify data units into the respective QoS flows. A default QoS rule may include a match-all packet filter, and typically be assigned with a lowest precedence. During a filtering operation, the filter sets are used according to the precedence of the respective QoS rules, and packets not matching other packet filters can be collected into the QoS flow (referred to as a default QoS flow) associated with the default QoS rule.

The QoS flow descriptions 219-229 of the PDU session 101 can be provided from the 5GC 130 when the PDU session 101 is established or modified. Each QoS flow description can include a QFI corresponding to the respective associated QoS flow. Each QoS flow description can further include a 5G QoS identifier (5QI) if the respective QFI is not the same as the 5QI of the respective QoS flow identified by the respective QFI. A 5QI can be used as an index to determine a set of QoS parameters (referred to as 5G QoS characteristics) in a mapping table providing a mapping between 5QI values and respective QoS characteristics. The 5G QoS characteristics indicated by a 5QI can describe a packet forwarding treatment that the respective QoS flow can receive, for example, between the UE 110 and the UPF 133.

The mapping table providing a mapping between 5QI values and respective QoS characteristics can be a standardized table, a preconfigured table, or a dynamically signaled table, for example, from the 5GC 130. An example of a standardized mapping table, "Table 5.7.4-1: Standardized 5QI to QoS characteristics mapping" is described in the 3GPP standard 23.501, Technical Specification Group Services and System Aspects; System architecture for the 5G System (5GS); Stage 2 (Release 16).

In the table mapping 5QI values with QoS characteristics, each 5QI value can have a resource type attribute (also referred to as a guaranteed bit rate (GBR) attribute). The resource type attribute can include a value of GBR, non-GBR, or delay critical GBR. In an embodiment, based on the resource attribute, a QoS flow corresponding to a 5QI can be categorized as a GBR QoS flow (including delay critical GBR flow) or a non-GBR QoS flow. For example, a QoS flow of a 5QI having a GBR or delay critical GBR attribute can be categorized as a GBR QoS flow, while a QoS flow of a 5QI having a non-GBR attribute can be categorized as a non-GBR QoS flow. Typically, a GBR QoS flow can be served with a guaranteed flow bit rate (GFBR), while a non-GBR QoS flow does not have a GFBR.

Accordingly, each QoS flow description of the PDU session 101, if the QoS flow is a GBR QoS flow, may further include the following parameters:

1) Guaranteed flow bit rate (GFBR) for UL;
2) Guaranteed flow bit rate (GFBR) for DL;
3) Maximum flow bit rate (MFBR) for UL;
4) Maximum flow bit rate (MFBR) for DL; and
5) optionally averaging window, applicable for both UL and DL.

Figure 3:
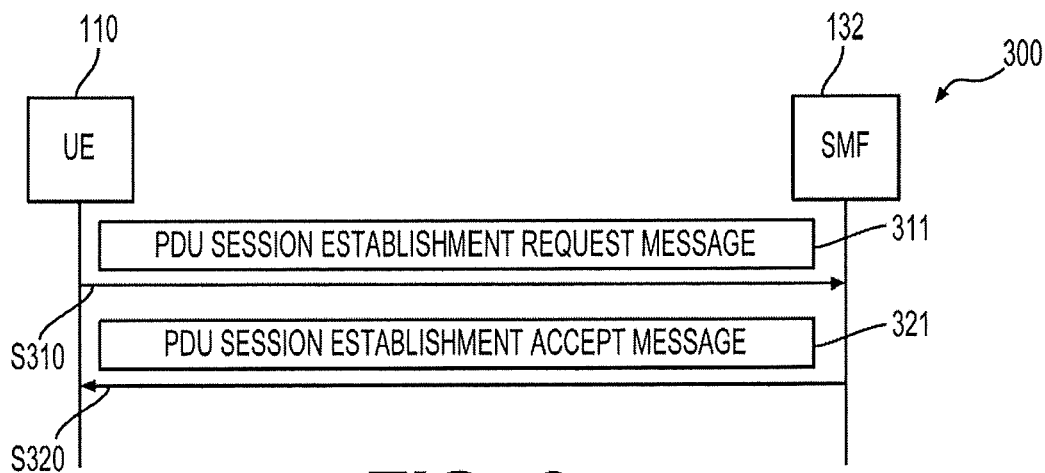
FIG. 3 shows an example UE-requested PDU session establishment process 300.

FIG. 3 shows an example UE-requested PDU session establishment process (or procedure) 300. The process 300 can includes steps S310-S320, and be performed between the UE 110 and the SMF 132 to establish a target PDU session.

At S310, a PDU session establishment request message 311 can be transmitted from the UE 110 to the SMF 132. The message 311 may include an associated PDU session ID, a PDU session type IE, a session and service continuity (SSC) mode IE, a maximum number of packet filters the UE 110 supports, a requested data network name (DNN), and the like.

At S320, a PDU session establishment accept message 321 can be transmitted from the SMF 132 to the UE 110. The message 321 can include an authorized QoS rules IE that is set to QoS rules authorized to the target PDU session. In addition, the message 321 may or may not include a QoS flow descriptions IE set to authorized QoS flow descriptions. In an example, the QoS flow descriptions IE is set to authorized QoS flow descriptions and provided when the authorized QoS rules IE indicate at least one GBR QoS flow, or a QFI is not the same as a 5QI of a QoS flow identified by the QFI.

The UE 110 can store the authorized QoS rules, and the authorized QoS flow descriptions (if available) for the target PDU session. In addition, the UE 110 can verify the authorized QoS rules and the authorized QoS flow descriptions provided in the PDU session establishment accept message 321 for different types of errors.

Figure 4:
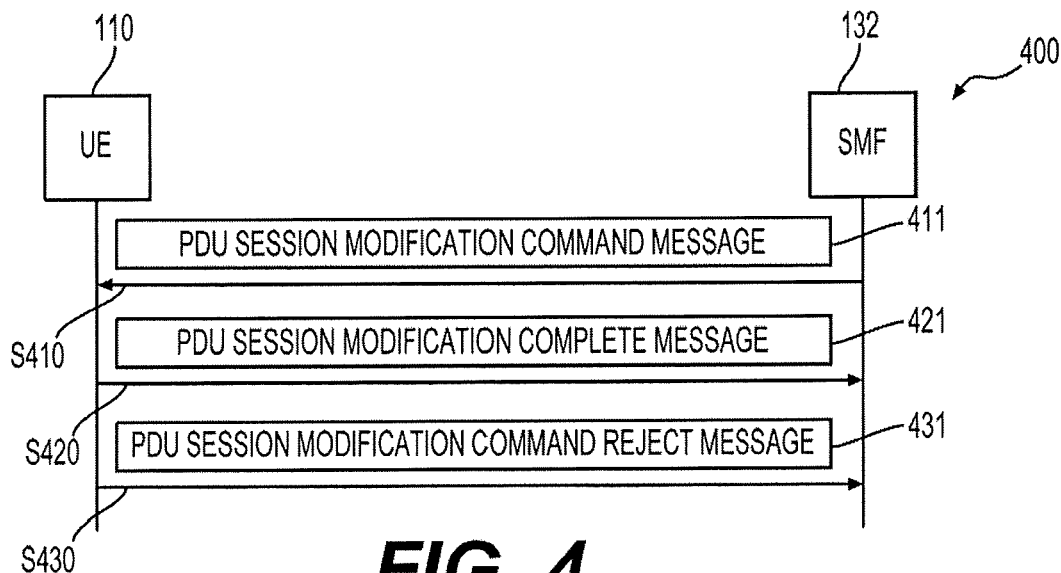
FIG. 4 shows an example network-requested PDU session modification process 400.

FIG. 4 shows an example network-requested PDU session modification process (or procedure) 400. The process 400 can include steps of S410-S420 (or S430), and be performed by the UE 110 and the SMF 132 to modify an existing PDU session. The network-requested PDU session modification process 400 can be performed in response to a UE request to modify the existing PDU session.

At S410, a PDU session modification command message 411 can be transmitted from the UE 110 to the SMF 132. The message 411 may include an authorized QoS rules IE set to authorized QoS rules that are to be modified or created at the UE 110. The message 411 may include an authorized QoS flow descriptions IE set to authorized QoS flow descriptions that are to be modified or created at the UE 110. In an example, when a new authorized QoS rule for a new QoS flow is to be created, an authorized QoS flow description for that new QoS flow can be set in the authorized QoS flow descriptions IE if the newly created authorized QoS rules are for a new GBR QoS flow, or a QFI of the new QoS flow is not the same as a 5QI of the QoS flow identified by the QFI.

The UE 110 may process the QoS rules in the authorized QoS rules IE sequentially starting with the first QoS rule. For example, the UE 110 can replace previously stored QoS rules, or QoS flow descriptions with received value(s), if any, in the message 411 (modification operation), or create QoS rules or QoS flow descriptions as indicated in the message 411 (creation operation). In addition, the UE 110 can verify the authorized QoS rules and the authorized QoS flow descriptions provided in the PDU session modification command message 411 for different types of errors. The verification can take place before or after the modification or creation operations.

At S420, the UE 110 can transmit a PDU session modification complete message 421 to the SMF 132. Or, at S430, the UE 110 can transmit a PDU session modification command rejection message 431 with a 5GSM cause IF indicating a reason for rejecting the PDU session modification. For example, the 5GSM cause IE may include a value of #26, insufficient resources; #43, invalid PDU session identity; #44, semantic error in packet filter(s); #45, syntactical error in packet filter(s); #83, semantic error in the QoS operation; #84, syntactical error in the QoS operation, or the like.

Figure 5:
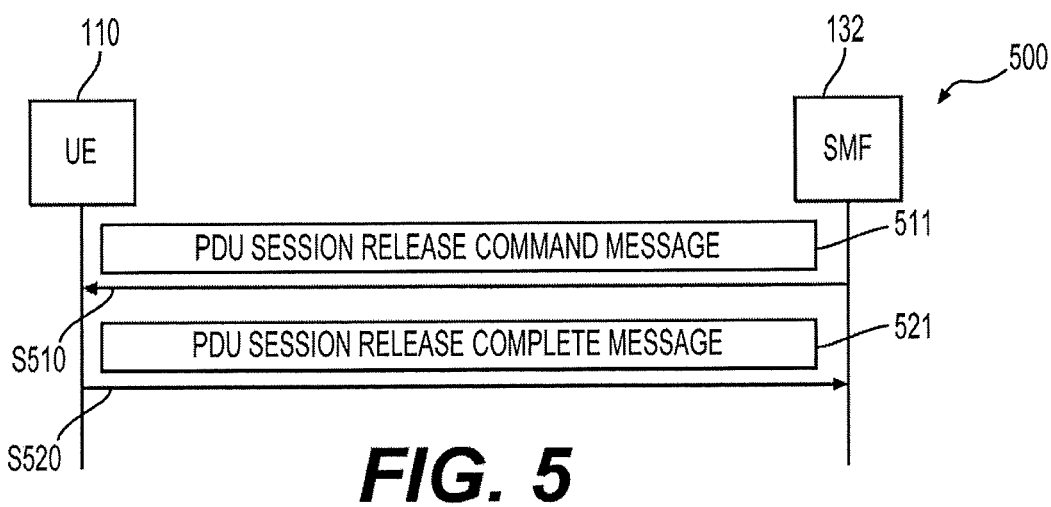
FIG. 5 shows an example network-requested PDU session release process 500.

FIG. 5 shows an example network-requested PDU session release process (or procedure) 500. The process 500 can include steps of S510-S520, and be performed by the UE 110 and the SMF 132 to release an existing PDU session. The process 500 can be performed in response to a UE request to release the existing session.

At S510, a PDU session release command message 511 can be transmitted from the SMF 132 to the UE 110. The message 511 may carry a 5GSM cause IE to indicate a reason for releasing the existing PDU session. The 5GSM cause IE may indicate one of the following cause values: #8, operator determined barring; #26, insufficient resources; #29, user authentication or authorization failed; #36, regular deactivation; #38, network failure; or the like.

At S520, the UE 110 may transport a PDU session release complete message 521 in response to receiving the message 511.

Figure 6:
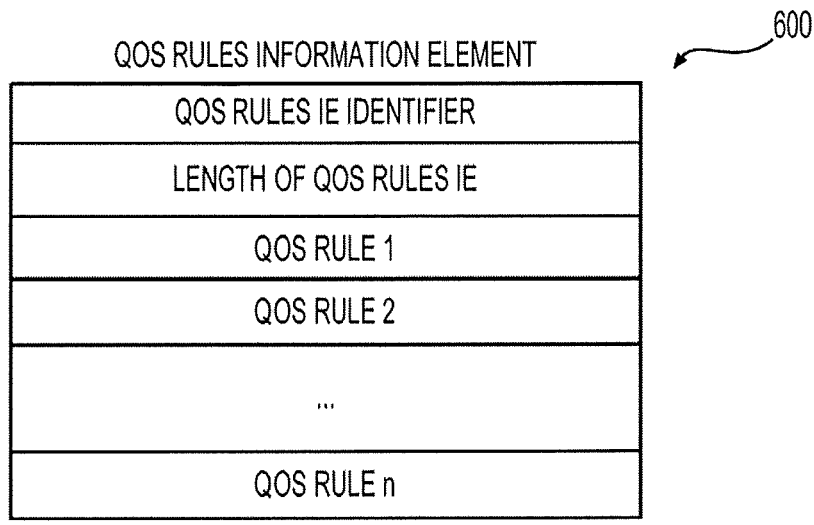
FIG. 6 shows an example of a quality of service (QoS) rules IE 600.

FIG. 6 shows an example of a QoS rules IE 600. The QoS rules IF 600 can be carried in the PDU session establishment accept message 321 in FIG. 3, or the PDU session modification command message 411 for creating or modifying (including deleting) a QoS rule at the UE 110. As shown, the IF 600 can include a QoS rules IE ID, a length of the QoS rules IE, and a sequence of QoS rule parameters.

Figure 7:
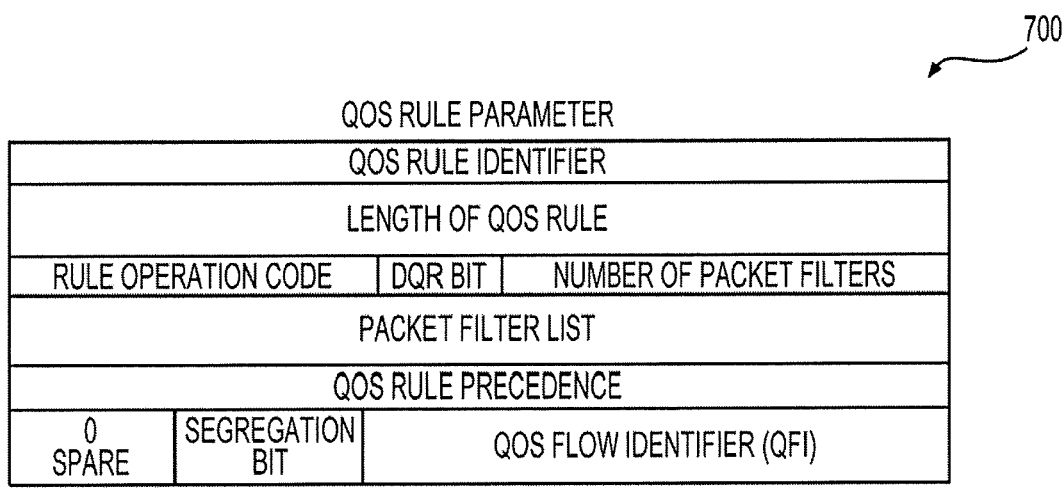
FIG. 7 shows an example of a QoS rule parameter 700 included in a QoS rules IE.

FIG. 7 shows an example of a QoS rule parameter 700 included in a QoS rules IE. As shown, the QoS rule parameter 700 can include a QoS rule ID, a length of the QoS rule parameter, a rule operation code, a default QoS rule (DQR) indication bit, a number of packet filters, a packet filter list, a QoS rule precedence, a segregation bit, and a QM, For example, the rule operation code can indicate one of the following QoS rule related operations:

Create new QoS rule; Delete existing QoS rule;
Modify existing QoS rule and add packet filters;
Modify existing QoS rule and replace all packet fitters;
Modify existing QoS rule and delete packet filters; or
Modify existing QoS rule without modifying packet filters.

For example, in an operation of "Modify existing QoS rule without modifying packet filters", a 5QI of the respective QoS rule can be modified.

FIG. 8 shows an example of a QoS flow descriptions IE 800. The QoS flow descriptions IE 800 can be carried in the PDU session establishment accept message 321 in FIG. 3, or the PDU session modification command message 411 for creating or modifying (including deleting) a QoS flow description at the UE 110. As shown, the IE 800 can include a QoS flow descriptions IE ID, a length of the QoS flow descriptions IE, and a sequence of QoS flow description parameters.

FIG. 9 shows an example of a QoS flow description parameter 900 included in a QoS flow descriptions IE. As shown, the QoS flow description parameter 900 can include a QFI indicating a QoS flow associated with the QoS flow description parameter 900, a QoS flow description operation code, a E bit, a number of parameters, and a parameter list.

The QoS flow description operation code can indicate the following operations:

Create new QoS flow description;
Delete existing QoS flow description; or
Modify existing QoS flow description.

For the "modify existing QoS flow description" operation, the E bit can indicate as follows: bit 0, extension of previously provided parameters; or bit 1, replacement of all previously provided parameters. If the E bit is set to "extension of previously provided parameter", and one of the parameters in the new parameters list already exists in the previously provided parameters, the parameter can be set to the new value. The parameter list can indicate one or more of the following parameters: 5QI, GFBR UL, GFBR DL, MFBR UL, MFBR DL, Averaging window, or evolved packet system (EPS) bearer identity.

Figure 10:
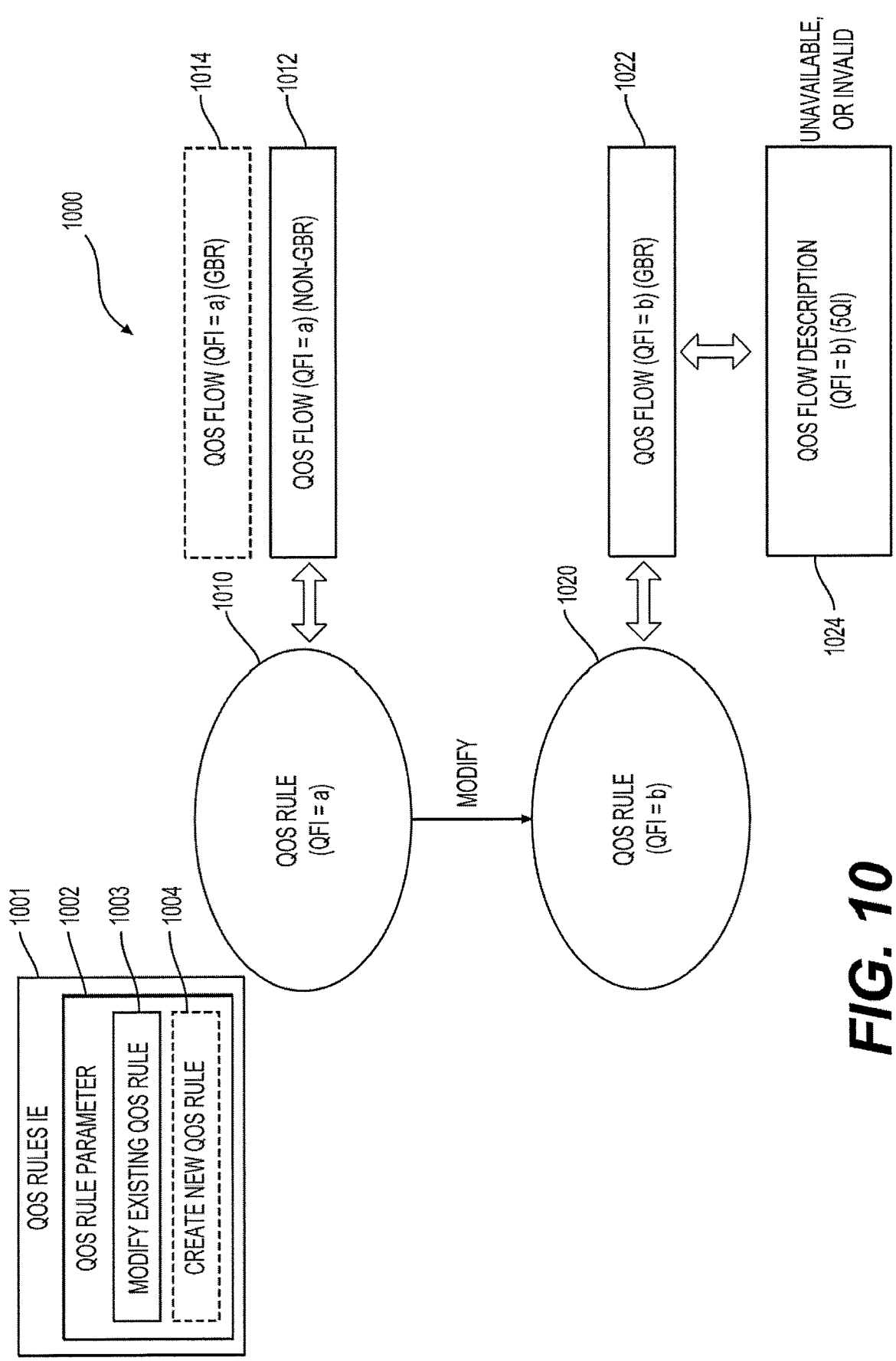
FIG. 10 shows an error checking and handling example 1000 related with PDU session modification operations according to an embodiment of the disclosure.

FIG. 10 shows an error checking and handling example 1000 related with PDU session modification operations according to an embodiment of the disclosure. The 5GS 100 is used as an example to explain the example 1000. For example, the session 101 has been established between the UE 110 and the DN 140. The PDU session modification process 400 can be initiated, and the PDU session modification command message 411 can be transmitted from SMF 132 to the UE 110. As shown in FIG. 10, the message 411 can carry a QoS rules IE 1001 that includes a QoS rule parameter 1002 corresponding to a QoS rule 1010 in FIG. 10.

For example, the QoS rule parameter 1002 can indicate an rule operation 1003 of "modify existing QoS rule". Based on the rule operation 1003, the QoS rule 1010 can be modified to generate a QoS rule 1020. The QoS rule 1010 can have a QFI=a, and is associated with a non-GBR QoS flow 1012 of QFI=a, while the QoS rule 1020 can have a QFI=b, and is associated with a GBR QoS flow 1022 of QFI=b. However, it may happen that there is no QoS flow description available that corresponds to the GBR QoS flow 1022. Typically, a QoS rule of a GBR QoS flow can have a corresponding QoS flow description providing sufficient parameters (e.g., 5QI, GFBR UL, GFBR DL, MFBR UL, MFBR DL, or the like) for defining the respective GBR QoS flow. Thus, the status that the QoS rule 1020 is associated with a GBR QoS flow but does not have a corresponding QoS flow description is not allowed, and is treated as an error. The parameters 5QI, GFBR UL, GFBR DL, MFBR UL, and MFBR DL, can be referred to as QoS flow description (QFD) parameters.

In addition to the status of no QoS flow description being available, in some examples, the status that a QoS flow description 1024 (having QFI=b) corresponding to the QoS rule 1020 exists, but is invalid is also not allowed, and is treated as an error. In various examples, whether a QoS flow description corresponding to a QoS rule associated with a GBR QoS flow is valid can be defined variously. In an example, the QoS flow description is not valid when one or more of the following QFD parameters are missing: 5QI, GFBR UL, GFBR DL, MFBR UL, MFBR DL. In an example, the QoS flow description is not valid when one or more of the following QFD parameters are missing: GFBR UL, GFBR DL, MFBR UL, and MFBR DL. In an example, the QoS flow description is not valid when one or both of the following QFD parameters are missing: 5QI, and MFBR UL. In an example, the QoS flow description is not valid when the parameter MFBR UL is missing.

In various examples, the PDU session modification command message 411 may (or may not) further include a QoS flow descriptions IE including a QoS flow description parameter corresponding to the QoS flow 1022. Accordingly, as indicated by the QoS flow description parameter, a flow description operation (deletion, creation, or modification) can be performed towards, for example, the QoS flow description 1024 accompanying the rule operation 1003 or 1004 towards the QoS rule 1010. Verification of the error can be performed with consideration of the flow description operation.

Before verifying if there is an error, whether the QoS rule 1020 is a QoS rule associated with a GBR QoS flow can be determined as follows. First, if there is a QoS flow description available (e.g., the QoS flow description 1024), and a 5QI is also available in this available QoS flow description, the value of the 5QI in the QoS flow description can be used to determine whether the respective QoS flow is a GBR QoS flow by referring the resource type attribute in a mapping table. Second, when no 5QI in a QoS flow description is available, the QFI=b of the QoS rule 1020 can be used as the 5QI to make a determination.

While FIG. 10 shows the example that the QoS rule 1010 of the non-GBR QoS flow 1012 is modified to be the QoS rule 1020 of the GBR QoS flow 1022, in other examples, when a QoS rule of a GBR QoS flow 1014 is modified to be another QoS rule of a GBR QoS flow, the same errors as described above may similarly take place.

In addition, before verification of any errors, the changes from the QoS rule 1010 to the QoS rule 1020 (as indicated by the rule operation 1003 of "modify existing QoS rule) can include other changes (e.g., changes to filters) in addition to the change of the QFI. In other examples, there may be no changes to the QFI (from a to b), the error can still take place.

Further, the QoS rule 1020 may be created based on a rule operation of "create a new QoS rule" instead of being modified from the QoS rule 1010. The error may still happen.

Accordingly, in some examples, with consideration of various possible changes caused by the QoS rules IE 1001 and additionally a QoS flow descriptions IE in the message 411, the above error checking operation can be performed.

When an error is verified, an error handling operation can be performed. In an example, the QoS rule 1020 associated with the GBR QoS flow 1022 is deleted. In an example, the UE 110 can request to the SMF 132 for a PDU session modification procedure to delete the QoS rule 1020 associated with the GBR QoS flow 1022. In an example, the UE 110 may reject the PDU session modification command in the message 411 by sending the PDU session modification command reject message 431, for example, indicating a proper 5GSM cause (e.g., #84, syntactical error in the QoS operation). In an example, the QoS rule 1020 can be a default QoS rule. Accordingly, the UE 110 can request for a PDU session release procedure, optionally, with a proper 5GSM cause, to release the PDU session 101. In an example, a combination of the above operations (deleting locally, and transmitting a request for modification or release) may be performed.

In an example, in addition to the QoS rule parameter 1002 corresponding to the QoS rule 1010, the QoS rules IE may include other QoS rule parameters corresponding to other QoS rules in the PDU session 101. Similarly, the message 411 may include a QoS flow descriptions IE that includes QoS flow description parameters corresponding to QoS flows other than the QoS flow 1022. Thus, the UE 110 may perform error checking one QoS rule by one QoS rule while the QoS rule parameters are processed sequentially according to an order of the QoS rule parameters in the QoS rules IE 1001. Under such a scenario, when an error is verified corresponding to the QoS rule 1020 or the QoS flow description 1024, the UE 110 may continue to complete rule operations or flow description operations corresponding to other QoS rules or QoS flow descriptions as indicated in the message 411. A proper error handling operation can be performed before or after those operations are completed.

Figure 11:
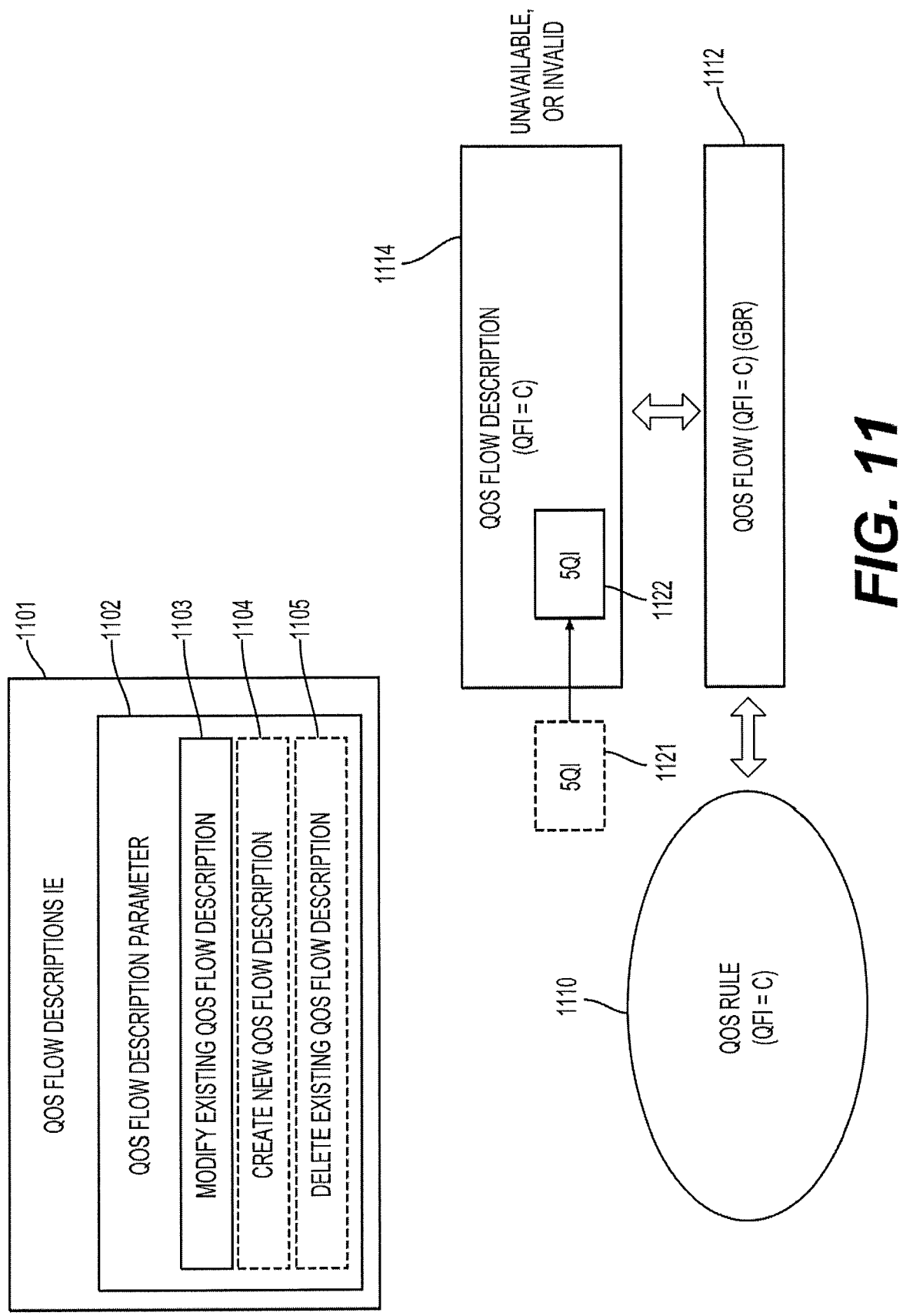
FIG. 11 shows another error checking and handling example 1100 related with PDU session modification operations according to an embodiment of the disclosure.

FIG. 11 shows another error checking and handling example 1100 related with PDU session modification operations according to an embodiment of the disclosure. The 5GS 100 is used as an example to explain the example 1100. For example, the session 101 has been established between the UE 110 and the DN 140. The PDU session modification process 400 can be initiated, and the PDU session modification command message 411 can be transmitted from SMF 132 to the UE 110. As shown in FIG. 10, the message 411 can carry a QoS flow descriptions IE 1101 that includes a QoS flow description parameter 1102 corresponding (both having a same QFI=c) to a QoS flow description 1114 in FIG. 11.

For example, the QoS flow description parameter 1102 can indicate a flow description operation 1103 of "modify existing QoS flow description". Accordingly, the QoS flow description 1114 can be modified as indicated. The modification may result in a QoS rule (having QFI=c) associated with a GBR QoS flow 1112 but without a valid QoS flow description, which is treated as an error.

As a particular example, in FIG. 11, a 5QI of the QoS flow description 1114 of QFI=c can be changed from a previous 5QI value 1121 having a non-GBR attribute to a new 5QI value 1122 having a GBR attribute (e.g., indicated by the resource type attribute in a respective mapping table). The changing of the 5QI value 1122 renders the QoS flow 1112 being changed from a non-GBR QoS flow to a GBR QoS flow. However, the QoS flow description 1114 can be an invalid QoS flow description for the GBR QoS flow 1112 or the QoS rule 1110 associated with the GBR QoS flow 1112. For example, some QFD parameters may be originally missing or caused by the modifications indicated by the flow description operation 1103.

In addition to the above particular example of modifying the 5QI, other changes related with the QoS flow descriptions IE 1101 in the message 411 may also cause the error that the QoS rule 1110 is associated with the GBR QoS flow 1112 but without a valid QoS flow description associated (either not existing, or existing but invalid). In an example, the flow description operation 1103 may indicate a deletion of some QFD parameters, which results in the QoS flow description 1114 having no sufficient QFD parameters when evaluated with a definition of invalidation. In an example, the QoS flow description parameter 1102 may indicate a "create new QoS flow description" operation 1104, which can provide an invalid QoS flow description of QFI=c. In an example, the QoS flow description parameter 1102 may indicate a "delete existing QoS flow description" operation 1105, which may render the QoS rule 1110 being associated with the GBR QoS flow 1112 but with no QoS flow description available.

In some examples, in addition to the QoS flow descriptions IE 1101, the PDU session modification command message 411 may (or may not) further include a QoS rule IE including a QoS rule parameter corresponding to the QoS rule 1110. Accordingly, a rule operation (creation, or modification) can be performed towards the QoS rule 1110 accompanying the flow description operations 1103, 1104, or 1105 before the verification of whether an error exists.

Determination of the QoS rule 1110 being associated with a GBR QoS flow can similarly be based on a 5QI value (if available in a QoS flow description) or the QFI=c (when 5QI is not available).

Similar to the FIG. 10 example, in addition to the QoS flow description parameter 1102 corresponding to the QoS flow description 1114, the QoS flow descriptions IE may include other QoS flow description parameters corresponding to other QoS flow descriptions. In addition, the message 411 may include a QoS rules IE that includes QoS rule parameters corresponding to QoS rules other than the QoS rule 1110. Thus, the UE 110 may perform error checking QoS flow description by QoS flow description while respective QoS flow description parameters are processed sequentially according to an order of the QoS flow description parameters in the QoS flow descriptions IE 1101. Under such a scenario, when an error is verified corresponding to the QoS rule 1110 or the QoS flow description 1114, the UE 110 may continue to complete rule operations or flow description operations corresponding to other QoS rules or QoS flow descriptions as indicated in the message 411. A proper error handling operation can be performed after or before those rule or flow description operations are completed.

Similar to the FIG. 10 example, with consideration of various possible changes caused by the QoS flow description IE 1101 and additionally a QoS rules IE in the message 411, the UE 110 can perform an error checking operation.

When an error is determined, an error handling operation can be performed. In addition to the error handling examples described in the FIG. 10 example, other possible error handling operations can include: deleting the invalid QoS flow description 1114 corresponding to the QoS rule 1110 associated with the GBR QoS flow 1112; or, initiating a UE requested PDU session modification procedure to delete the invalid QoS flow description 1114 corresponding to the QoS rule 1110 associated with the GBR QoS flow 1112.

Figure 12:
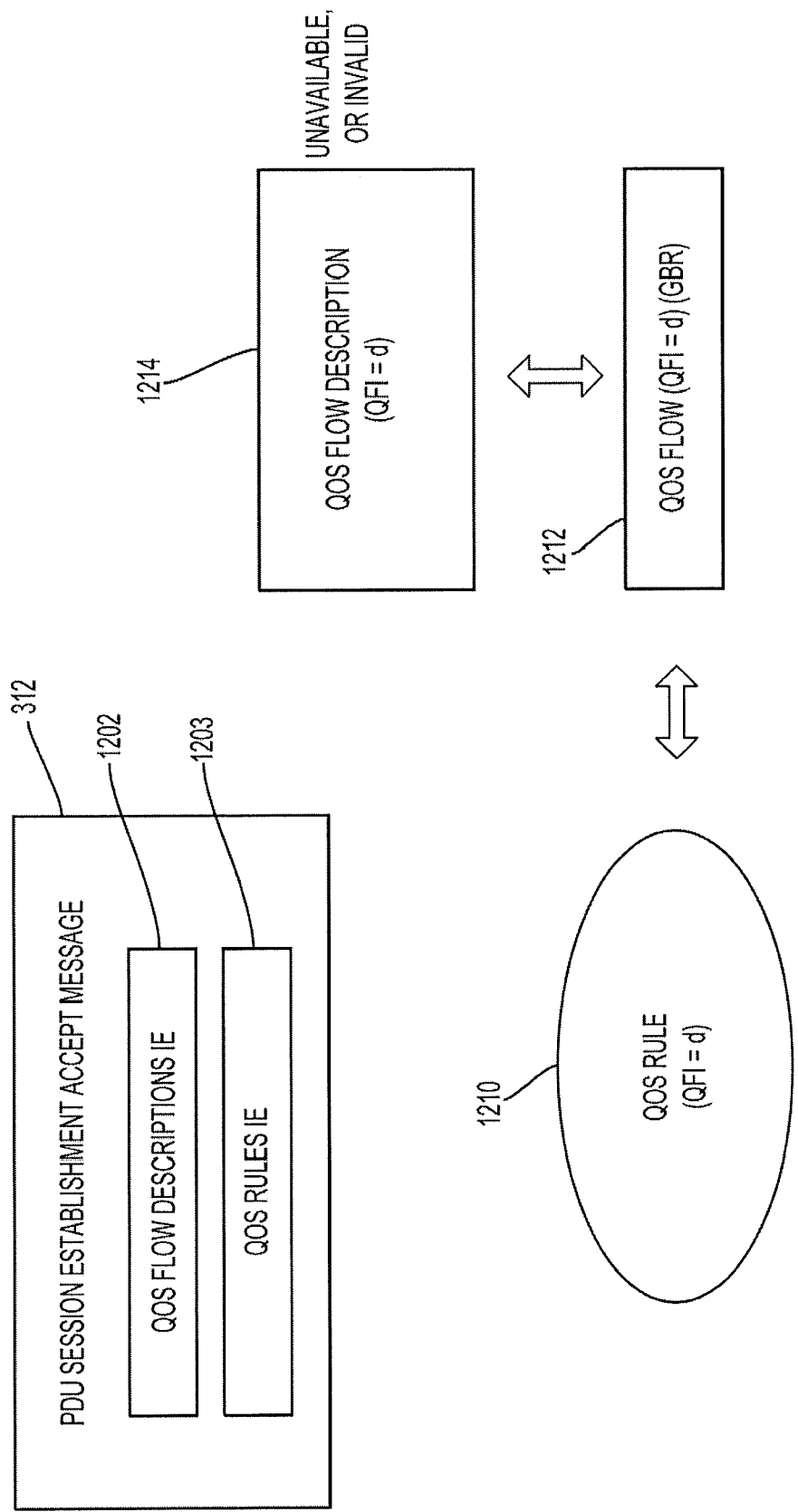
FIG. 12 shows another error checking and handling example 1200 related with PDU session establishment operations according to an embodiment of the disclosure.

FIG. 12 shows another error checking and handling example 1200 related with PDU session establishment operations according to an embodiment of the disclosure. The 5GS 100 is used as an example to explain the example 1200. For example, the session 101 is to be established between the UE 110 and the DN 140. The PDU session establishment process 300 can be initiated, and the PDU session establishment accept message 321 can be transmitted from SMF 132 to the UE 110.

As shown in FIG. 12, the message 312 can carry a QoS flow descriptions IE 1202 and a QoS rules IE 1203. For example, the QoS flow descriptions IE may include a QoS flow description parameter indicating creation of a QoS flow description 1214, while the QoS rules IE may include a QoS rule parameter indicating creation of a QoS rule 1210. The QoS rule 1210 and the QoS flow description 1214 can both be associated with a GBR QoS flow 1212 having a QFI=d.

As a result of the above creation operations, the QoS rule 1210 can generated to be associated with the GBR QoS flow 1212 but with the QoS flow description 1214 being invalid.

In another example, the QoS flow descriptions IE 1202 may not provide a QoS flow description parameter corresponding to the QoS flow of QFI=d. In such a case, the QoS rule 1210 can be generated to be associated with GBR QoS flow 1212 without a QoS flow description available.

To handle possible errors related with the PDU session establishment, the UE 110 can perform error handling operations similar to that in the FIG. 11 examples with an exception. The exception is that the operation of rejecting the PDU session modification command available in the PDU session modification process 400 is not an option in the PDU session establishment process 300.

In addition, similar to the FIG. 10 or FIG. 11 example, the QoS flow descriptions IE 1202 and the QoS rules IE 1203 may indicate rule operations or flow description operations towards QoS rules or QoS flow descriptions other than the QoS rule 1210 or the QoS flow description 1214. During the process of processing the QoS flow descriptions IE 1202 (if available) and the QoS rules IE 1203, the QoS rule parameters or QoS flow description parameters may be processed one by one, and an error checking operation may accompany the processing of each QoS rule parameter or QoS flow description. When an error is determined with a particular QoS rule or QoS flow description, the UE 110 can continue to complete the processing of the remaining QoS rule parameters or QoS flow description parameters. The error handling operations may be performed before or after completion of the processing of the QoS rule parameters and QoS flow description parameters in various examples.

Figure 13:
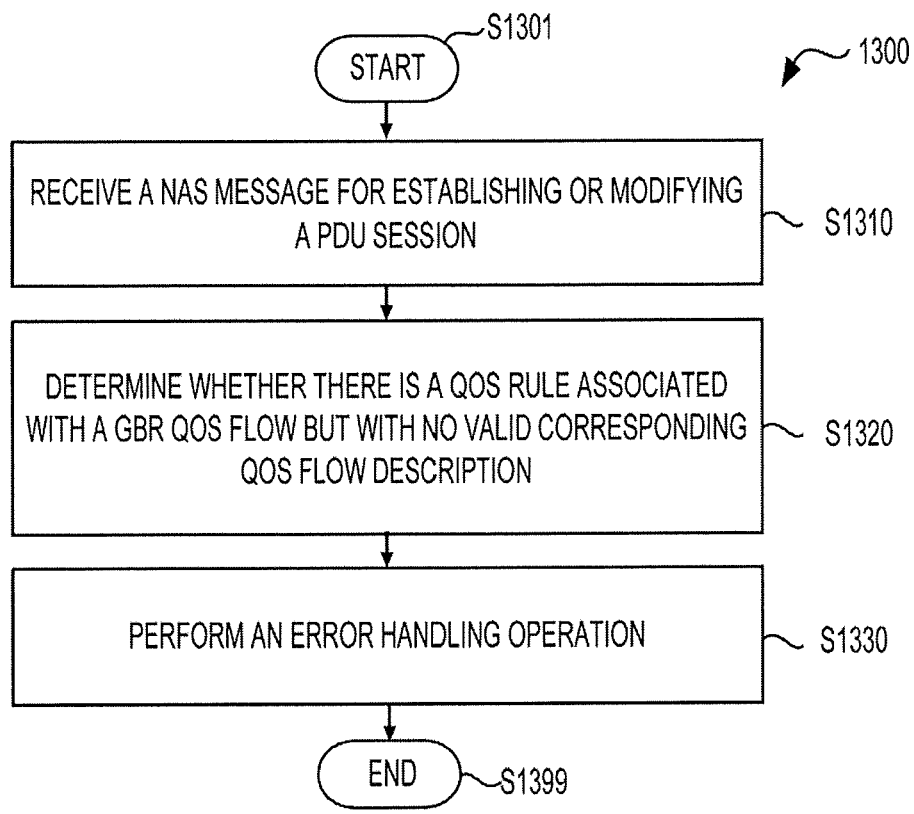
FIG. 13 shows a process 1300 of checking and handling errors during a PDU session establishment or modification process at a UE according to an embodiment of the disclosure.

FIG. 13 shows a process 1300 of checking and handling errors during a PDU session establishment or modification process at a UE according to an embodiment of the disclosure. The process 1300 can start from S1301 and proceed to S1310.

At S1310, a NAS message can be received at the UE from a core network. For example, the NAS message can be a PDU session modification command message for modifying a PDU session at the UE, or can be a PDU session establishment accept message for establishing the PDU session at the UE. The NAS message can carry a QoS rules IE indicating one or more rule operations to one or more QoS rules, respectively, and/or a QoS flow descriptions IE indicating one or more flow description operations to one or more QoS flow descriptions, respectively. Those rule operations and/or flow description operations may potentially generate errors. For example, those operations may result in a QoS rule associated with a GBR QoS flow but without a valid QoS flow description.

At S1320, in response to reception of the NAS message for establishing or modifying the PDU session, it can be determined whether of the resulting PDU session there is a QoS rule associated with a GBR QoS flow but there is no valid QoS flow description corresponding to the QoS rule associated with the GBR QoS flow. Or, in other words, it can be determined whether of the resulting PDU session there is a QoS rule associated with a GBR QoS flow but there is no valid QoS flow description having a QFI the same as the QFI of the QoS rule associated with the GBR QoS flow.

For example, the rule operations and/or description operations indicated in the NAS message can be processed or carried out one by one, for example, according to an order that the rule operations and/or description operations are arranged in the NAS message. While processing each operation, the error checking as to whether there is the QoS rule associated with the GBR QoS flow but without a valid corresponding QoS flow description can be performed. In some other examples, the error checking can be performed after the rule operation and/or flow description operations indicated in the NAS message are complete.

In an example, corresponding to processing of each rule or flow description operation, the error checking can be performed after the respective operation has been implemented. In contrast, in another example, the error checking can be performed without the respective operation being actually performed. Instead, it is verified whether an error will arise if the respective operation is performed.

At S1330, an error handling operation can be performed when an error is found that there is the QoS rule that is associated with the GBR QoS flow and has no valid corresponding QoS flow description. For example, a UE requested PDU session modification process can be initiated to delete the QoS rule associated with the GBR QoS flow. The process can proceed to S1399, and terminate at S1399.

In some embodiments, instead of checking for an error that a QoS rule associated with a GBR QoS flow has no valid QoS flow description, the UE 110 may perform an error checking operation to check for an error that a QoS flow description associated with a GBR QoS flow lacks at least one of mandatory parameters. Examples regarding an invalid QoS flow description with mandatory parameters missing are described herein.

Figure 14:
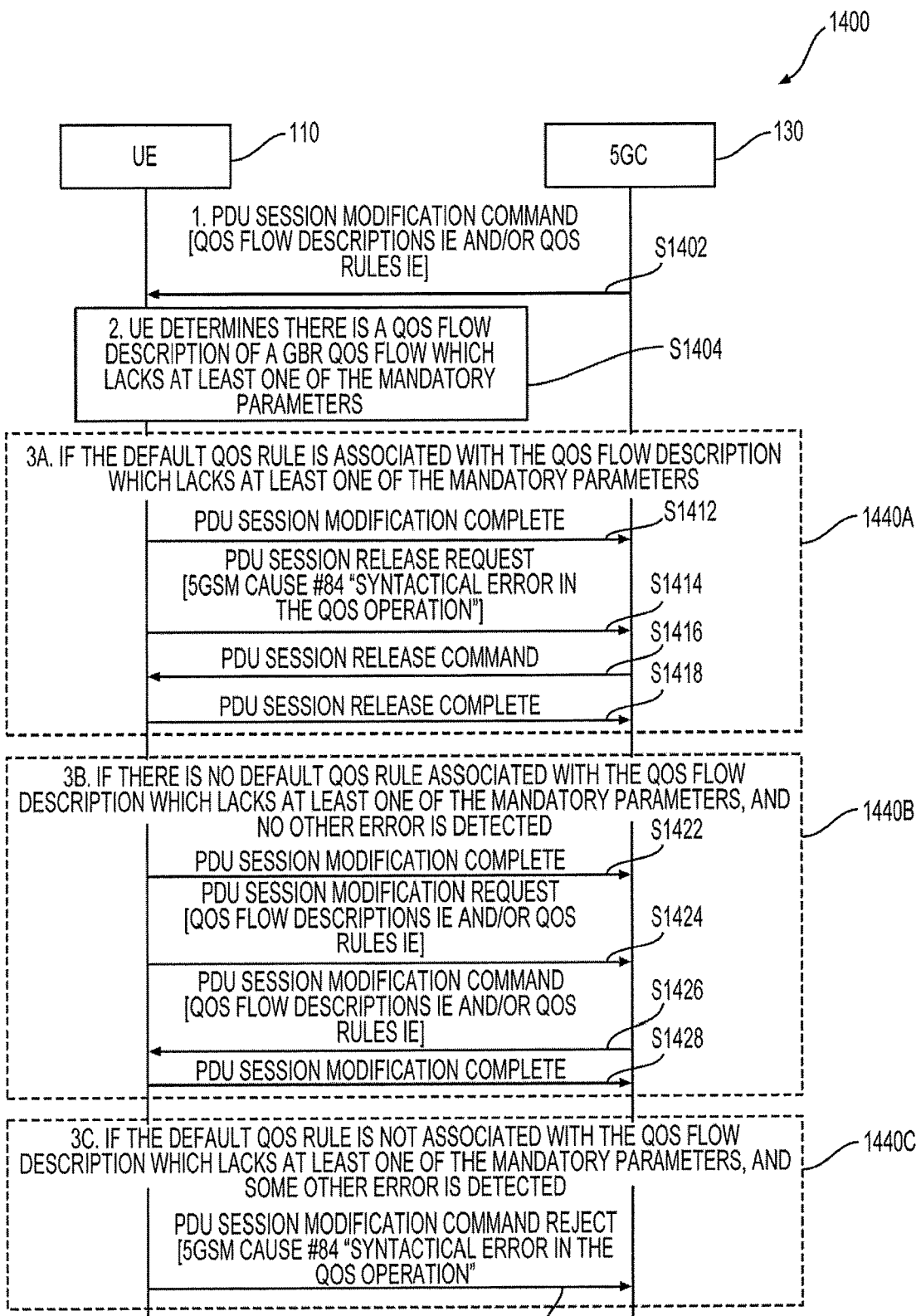
FIG. 14 shows an error checking and handling process 1400 corresponding to a PDU session modification procedure according to embodiments of the disclosure.

FIG. 14 shows an error checking and handling process 1400 associated with a PDU session modification procedure according to embodiments of the disclosure. The 5GS 100 in the FIG. 1 example is used as an example for explanation of the process 1400. Accordingly, the process 1400 can be performed between the UE 110 and the 5GC 130.

At S1402, the PDU session modification procedure can be initiated, and a PDU session modification command message (that is a NAS message) can be received from the 5GC 130 at the UE 110.

The PDU session modification command message can include a QoS flow descriptions IE, and optionally other types of IEs (e.g., QoS rules IE, mapped EPS bearer contexts IE, or the like) for modifying the existing PDU session 101. Similar to the examples of FIGS. 7-8, the QoS flow description IE received at S1402 can include one or more QoS flow description parameters. Each QoS flow description parameter can include a QFI, a flow description operation code, and a list of QFD parameters, such as 5QI, GFBR UL, GFBR DL, MFBR UL, MFBR DL, Averaging window, or EPS bearer identity.

At S1404, the UE 110 determines there is a QoS flow description of a GBR QoS flow which lacks at least one of mandatory parameters.

For example, the flow description operation codes received at S1402 can each indicate a request to create a new QoS flow description, or modify an existing QoS flow description. QoS flow descriptions resulting from the creation or modification can be said to be QoS flow descriptions provided by or contained in the QoS flow descriptions IE or the NAS message received at S1402. Similarly, QoS rules can be provided by or contained in the QoS rules IE or the NAS message received at S1402.

Upon receiving the PDU session modification command message, the UE 110 can check the QoS rules and the QoS flow descriptions provided in the NAS message received at S1402 for different types of errors. For example, the errors can be a semantic error, or syntactical error in rule or flow description operations, a semantic error or syntactical error in packet filters, or other types of errors.

For QoS flow descriptions resulting from flow description operations of "create new QoS flow description" or "modify existing QoS flow description" in the NAS message received at S1402, the UE 110 can check the resulting QoS flow descriptions for the error of invalid QoS flow description associated with a GBR QoS flow.

As described above, whether a QoS flow description associated with a GBR QoS flow is valid may be defined differently in various examples. In an embodiment, it is defined that a valid QoS flow description of a GBR QoS flow includes the following mandatory parameters: GFBR UL, GFBR DL, MFBR UL, MFBR DL. When at least one of the mandatory parameters is missing, the respective QoS flow description of a GBR QoS flow is treated as invalid, and a syntactical error can be determined to exist.

In addition, in an embodiment, whether a resulting QoS flow description is associated with a GBR QoS flow can be determined based on the 5QI or the QFI in the resulting QoS flow description. For example, the QoS flow description can be determined to be associated with the GBR QoS flow when 5QI in the QoS flow description has a GBR resource type or a delay-critical GBR resource type. Or, when no 5QI is included in the QoS flow description, the QoS flow description can be determined to be associated with the GBR QoS flow when QFI in the QoS flow description has a value of a 5QI having a GBR resource type or a delay-critical GBR resource type.

Accordingly, when a flow description operation indicated in the NAS message received at S1402 is "create new QoS flow description" or "modify existing QoS flow description", and the UE 110 determines there is a resulting QoS flow description of a GBR QoS flow which lacks at least one of the mandatory parameters (i.e., GFBR UL, GFBR DL, MFBR UL, MFBR DL), an error regarding the invalid QoS flow description of the GBR QoS flow can be determined.

Upon the UE 110 detecting the error at S1404, an error handling operation can subsequently be conducted. Corresponding to different scenarios, different groups of steps (e.g., groups of 1440a, 1440b, or 1440c) can be conducted in the error handling operation. During the error checking, the UE 110 can check those scenarios sequentially, for example, from 1440a to 1440c, and perform the respective group of steps accordingly.

In a first scenario of 1440a, when a default QoS rule of the PDU session 101 is associated with the QoS flow description which lacks at least one of the mandatory parameters, the group 1410a of steps S1412-S1418 can be performed. At S1412, the UE 110 can complete the PDU session modification procedure initiated at S1402 by transmitting a PDU session modification complete message. At S1414, the UE 110 can initiate a PDU session release procedure, and transmit a PDU session release request message with a proper 5GSM cause (e.g., #84, "syntactical error in the QoS operation"; a rule operation or a flow description can be referred to as a QoS operation). At S1416, the 5GC 130 replies with a PDU session release command. At S1418, the UE 110 transmits a PDU session release complete message to complete the PDU session release procedure.

In a second scenario of 1440b, when (1) there is no default QoS rule associated with the QoS flow description which lacks at least one of the mandatory parameters, (2) there is a QoS rule IE(s) that contains at least one valid QoS rule or a QoS flow descriptions IE(s) that contains at least one other valid QoS flow description, and (3) there are no errors (associated with other invalid QoS rules or QoS flow descriptions provided by the NAS message received at S1402) that would incur a rejection operation (e.g., S1432), the group of steps of S1422-S1428 can be performed. In this way, the UE 110 can further process requests of the at least one valid QoS rule or the at least one other valid QoS flow description (fulfill the respective valid operations) without diagnose an error regarding the invalid QoS flow description determined at S1404. Diagnosing the error would trigger a rejection operation (e.g., S1432), which makes completing the valid operations impossible. After completion of the valid operations, or while conducting the valid operations, in an example, a subsequent PDU session modification procedure (S1424-S1428) can be performed to address the error regarding the invalid QoS flow description detected at S1404.

For example, at S1422, a PDU session modification complete message can be transmitted to complete the PDU session modification procedure initiated at S1402, for example, after completion of the valid operations.

At S1424, the UE 110 may initiate a PDU session modification procedure (S1424-S1428) by transmitting a PDU session modification request message. The PDU session modification request message can include a proper 5GSM cause (e.g., #84, "syntactical error in the QoS operation"). The PDU session modification request message can include a QoS flow descriptions IE and/or a QoS rules IE to request for rule operations or flow description operations to handle errors detected. The requested operations can include deleting the invalid QoS flow description detected at S1404, and one or more QoS rules associated with the invalid QoS flow description.

In an embodiment, in addition to sending the PDU session modification request message to delete the invalid QoS flow description and associated QoS rule, the UE 110 may locally delete the invalid QoS flow description and the associated QoS rule(s) after detected, for example, to avoid incurring any further issue related with the invalid QoS flow description. In contrast, when the UE 110 determines immediate deletion is not necessary, the UE 110 may conduct the deletion after receiving a PDU session modification command (e.g., S1426).

At S1426, the 5GC 130 replies with the PDU session modification command message carrying QoS flow descriptions IE and/or QoS rules IE, for example, for deleting or modifying invalid QoS rules and/or QoS flow descriptions. At S1428, the UE 110 transmits a PDU session modification complete message to complete the PDU session modification procedure initiated at S1424.

In a third scenario of 1440c where the first and second groups of steps are not applicable, at S1432, a PDU session modification command reject message can be transmitted with a proper 5GSM cause (e.g., #84, "syntactical error in the QoS operation", or other causes). For example, there is no default rule associated with the invalid QoS flow description, but there is an error associated with other invalid QoS rules or QoS flow descriptions provided by the NAS message received at S1402 (e.g., semantic errors or syntactical errors in packet filters) which would incur the rejection at S1432. In addition, when there is no error incurring the rejection at S1432, but there is no other valid QoS rule or QoS flow description provided by the NAS message received at S1402 besides the invalid QoS flow description determined at S1404, the rejection at S1432 can also be performed in an example.

Figure 15:
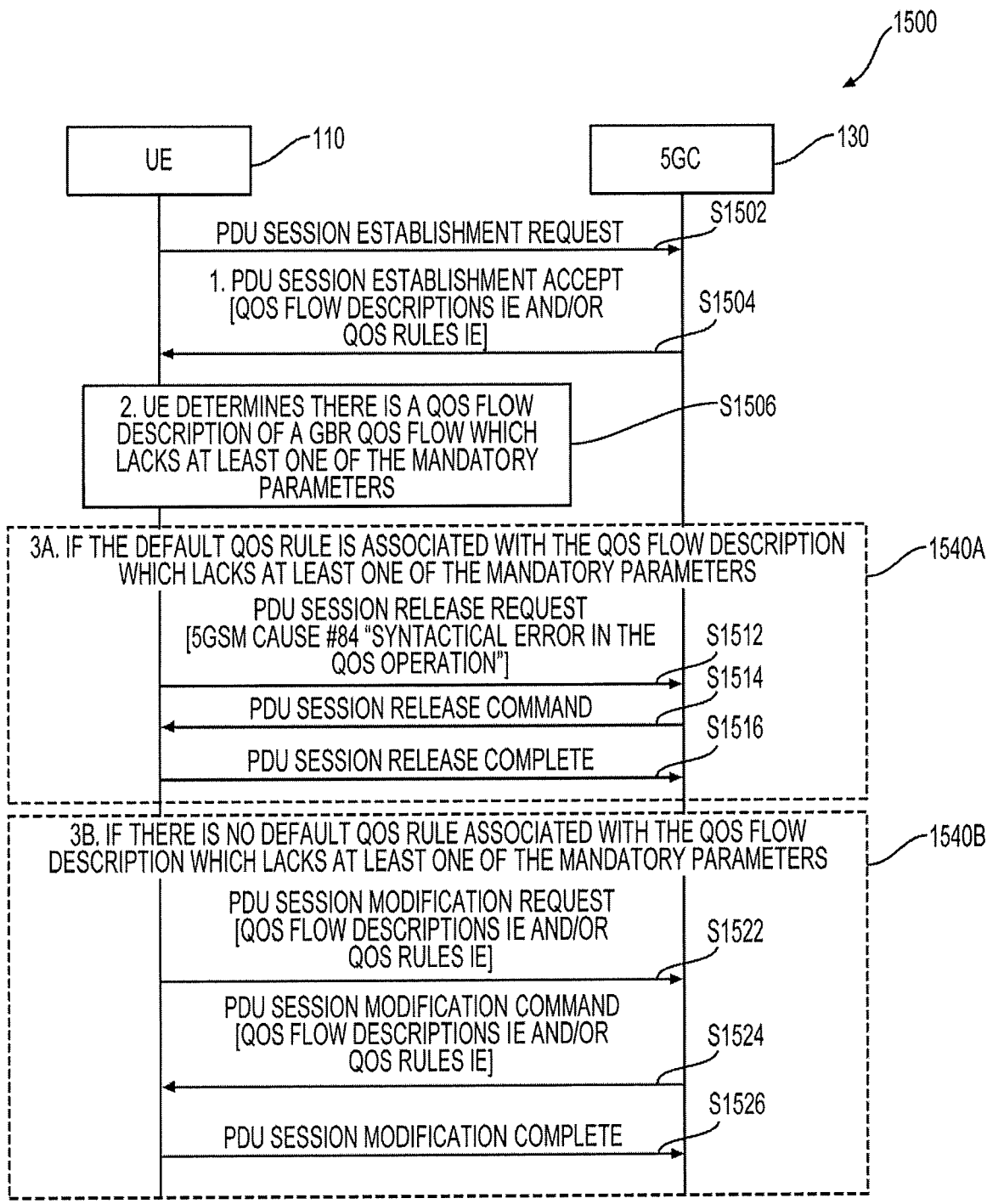
FIG. 15 shows an error checking and handling process 1500 corresponding to a PDU session establishment procedure according to embodiments of the disclosure.

FIG. 15 shows another error checking and handling process 1500 corresponding to a PDU session establishment procedure according to embodiments of the disclosure. Similarly, the 5GS 100 in the FIG. 1 example is used as an example for explanation of the process 1500. Accordingly, the process 1500 can be performed between the UE 110 and the 5GC 130 to establish the PDU session 101.

At S1502, the UE 110 can transmit a PDU session establishment request message the 5GC 130 to initiate a PDU session establishment procedure.

At S1504, the 5GC 130 can reply a PDU session establishment accept message that includes a QoS flow descriptions IE and/or a QoS rules IE (possibly other IEs) to provide one or more QoS rules and one or more QoS flow descriptions for establishing the PDU session 101. For example, the QoS flow descriptions IE and/or QoS rules IE can include flow description operations and/or rule operations to request for creating new QoS flow descriptions or new QoS rules.

At S1506, the UE 110 can determine there is a QoS flow description of a GBR QoS flow which lacks at least one of mandatory parameters. Similarly, upon receiving the PDU session establishment accept message, the UE 110 can check the QoS rules and the QoS flow descriptions provided in the PDU session establishment accept message received at S1504 for different types of errors. For example, the errors can be a semantic error, or syntactical error in rule operations or flow description operations, a semantic error or syntactical error in packet filters, or other types of errors.

For QoS flow descriptions resulting from flow description operations "create new QoS flow description" in the NAS message received at S1504, the UE 110 can check the resulting QoS flow descriptions for the error of invalid QoS flow description associated with a GBR QoS flow. When a flow description operation indicated in the NAS message received at S1504 is "create new QoS flow description", and the UE 110 determines there is a resulting QoS flow description of a GBR QoS flow which lacks at least one of the mandatory parameters (i.e., GFBR UL, GFBR DL, MFBR UL, MFBR DL), an error regarding the invalid QoS flow description of the GBR QoS flow can be determined.

Upon the UE 110 detecting the error at S1506, an error handling operation can subsequently be conducted. Corresponding to different scenarios, different groups of steps (e.g., groups of 1540a or 1540b) can be conducted in the error handling operation. The UE 110 may check the different scenarios sequentially, for example, from 1540a to 1540b, in an example.

In a first scenario, when a default QoS rule is associated with the QoS flow description which lacks at least one of the mandatory parameters, the group 1540a of steps S1512-S1516 similar to S1414-S1418 can be performed. At S1512, the UE 110 can initiate a PDU session release procedure by sending a PDU session release request message with a proper 5GSM cause (e.g., #84, "syntactical error in the QoS operation"). At S1514, the 5GC 130 replies with a PDU session release command. At S1516, the UE 110 transmits a PDU session release complete message to complete the PDU session release procedure.

In a second scenario, when there is no default QoS rule associated with the QoS flow description which lacks at least one of the mandatory parameters, the group 1540b of steps S1522-S1526 similar to S1424-S1428 can be performed. For example, at S1522, the UE 110 may initiate a PDU session modification procedure (S1522-S1526) to delete the invalid QoS flow description detected at S1506, and one or more QoS rules associated with the invalid QoS flow description detected at S1506. For example, a PDU session modification request message can be transmitted at S1522. The PDU session modification request message can include a proper 5GSM cause (e.g., #84, "syntactical error in the QoS operation"). At S1524, the 5GC 130 can reply with a PDU session modification command. At S1526, the UE 110 can transmit a PDU session modification complete message to complete the PDU session modification procedure initiated at S1522.

Similar to the scenario of 1440*b*, in an embodiment, in addition to sending the PDU session modification request message to delete the invalid QoS flow description and associated QoS rule at S1522, the UE 110 may locally delete the invalid QoS flow description and associated QoS rule after detected, for example, to avoid incurring any further issue related with the invalid QoS flow. Or, when the UE 110 determines immediate deletion is not necessary, the UE 110 may conduct the deletion after receiving the PDU session modification command at S1524.

In addition, similar to the scenario of 1440*b*, when there is a QoS rule IE(s) that contains at least one valid QoS rule or a QoS flow descriptions IE(s) that contains at least one other valid QoS flow description, the UE 110 can further process requests of the at least one valid QoS rule or the at least one other valid QoS flow description (fulfill the respective valid operations) after detecting the invalid QoS flow description at S1506.

Figure 16:
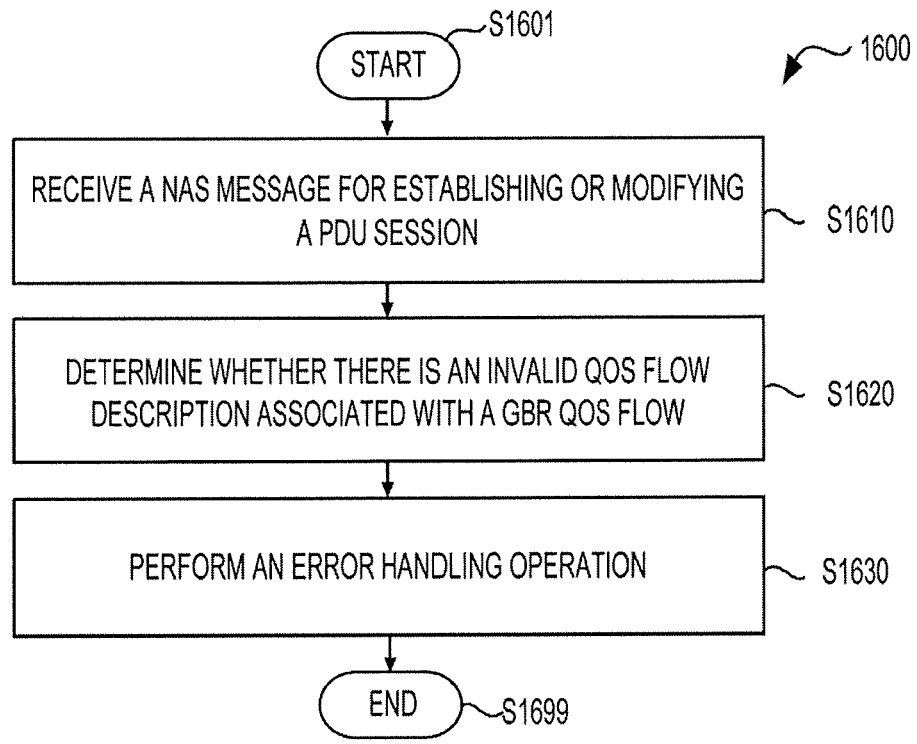
FIG. 16 shows a process 1600 of checking and handling errors during a PDU session establishment or modification process at a UE according to an embodiment of the disclosure.

FIG. 16 shows a process 1600 of checking and handling errors during a PDU session establishment or modification process at a UE according to an embodiment of the disclosure. The process 1600 can start from S1601 and proceed to S1610.

At S1610, a NAS message can be received at the UE from a core network. For example, the NAS message can be a PDU session modification command message for modifying an existing PDU session at the UE, or can be a PDU session establishment accept message for establishing the PDU session at the UE. The NAS message can carry a QoS rules IE indicating one or more rule operations to create or modify one or more QoS rules, and/or a QoS flow descriptions IE indicating one or more flow description operations to create or modify one or more QoS flow descriptions. Those rule operations and/or flow description operations may potentially cause errors. For example, those operations may result in a QoS flow description associated with a GBR QoS flow that lacks at least one of mandatory parameters (e.g., GFBR UL, GFBR DL, MFBR UL, MFBR DL).

At S1620, in response to reception of the NAS message for establishing or modifying the PDU session, it can be determined whether there is a QoS flow description resulting from the establishment or modification of the PDU session that is associated with a GBR QoS flow of the PDU session, and lacks at least one of the mandatory parameters (e.g., GFBR UL, GFBR DL, MFBR UL, MFBR DL).

For example, the rule operations and/or description operations indicated in the NAS message can be processed or carried out one by one, for example, according to an order that the rule operations and/or the description operations are arranged in the NAS message. While processing each operation, an error checking can be performed. In some other examples, the error checking can be performed after the rule operations and/or flow description operations indicated in the NAS message are complete.

In an example, corresponding to processing of each rule or flow description operation, the error checking can be performed after the respective operation has been conducted. In contrast, in another example, the error checking can be performed without the respective operation being actually performed. Instead, it is verified whether an error will arise if the respective operation is performed.

At S1630, an error handling operation can be performed when it is determined that there is the invalid QoS flow description associated with the GBR QoS flow of the PDU session. In an example, when the invalid QoS flow description associated with the GBR QoS flow of the PDU session is associated with a default QoS rule of the PDU session, a process to release the PDU session can be initiated. In an example, when the invalid QoS flow description associated with the GBR QoS flow of the PDU session is not associated with a default QoS rule of the PDU session, the invalid QoS flow description and QoS rules corresponding to the invalid QoS flow description, if any, can be deleted, and/or a PDU session modification process to delete the invalid QoS flow description and the QoS rules corresponding to the invalid QoS flow description.

In an example, a 5GSM cause is indicated to the core network. In an example, one or more operations indicated by the NAS message other than the flow description operation providing the invalid QoS flow description can be complete in addition to initiating the PDU session modification process. The process can proceed to S1699, and terminate at S1699.

Figure 17:
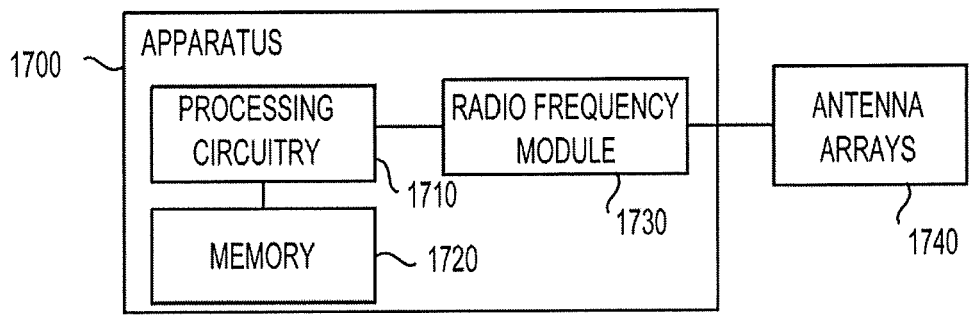
FIG. 17 shows an exemplary apparatus 1700 according to embodiments of the disclosure.

FIG. 17 shows an exemplary apparatus 1700 according to embodiments of the disclosure. The apparatus 1700 can be configured to perform various functions in accordance with one or more embodiments or examples described herein. Thus, the apparatus 1700 can provide means for implementation of mechanisms, techniques, processes, functions, components, systems described herein. For example, the apparatus 1700 can be used to implement functions of UEs, BSs, and elements of core networks in various embodiments and examples described herein. The apparatus 1700 can include a general purpose processor or specially designed circuits to implement various functions, components, or processes described herein in various embodiments. The apparatus 1700 can include processing circuitry 1710, a memory 1720, and optionally a radio frequency (RF) module 1730.

In various examples, the processing circuitry 1710 can include circuitry configured to perform the functions and processes described herein in combination with software or without software. In various examples, the processing circuitry 1710 can be a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry 1710 can be a central processing unit (CPU) configured to execute program instructions to perform various functions and processes described herein. Accordingly, the memory 1720 can be configured to store program instructions. The processing circuitry 1710, when executing the program instructions, can perform the functions and processes. The memory 1720 can further store other programs or data, such as operating systems, application programs, and the like. The memory 1720 can include non-transitory storage media, such as a read only memory (ROM), a random access memory (RAM), a flash memory, a solid state memory, a hard disk drive, an optical disk drive, and the like.

In an embodiment, the RF module 1730 receives a processed data signal from the processing circuitry 1710 and converts the data signal to beamforming wireless signals that are then transmitted via antenna arrays 1740, or vice versa. The RF module 1730 can include a digital to analog converter (DAC), an analog to digital converter (ADC), a frequency up converter, a frequency down converter, filters and amplifiers for reception and transmission operations. The RF module 1730 can include multi-antenna circuitry for beamforming operations. For example, the multi-antenna circuitry can include an uplink spatial filter circuit, and a downlink spatial filter circuit for shifting analog signal phases or scaling analog signal amplitudes. The antenna arrays 1740 can include one or more antenna arrays.

The apparatus 1700 can optionally include other components, such as input and output devices, additional or signal processing circuitry, and the like. Accordingly, the apparatus 1700 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
   receiving a non-access stratum (NAS) message for establishing or modifying a protocol data unit (PDU) session at a user equipment (UE) from a core network;
   determining there is an invalid quality of service (QoS) flow description resulting from the establishment or modification of the PDU session upon
      the NAS message including a flow description operation of create new QoS flow description or modify existing QoS flow description, and
      determining that the QoS flow description is associated with a guaranteed bit rate (GBR) QoS flow of the PDU session and lacks at least one of mandatory parameters; and
   upon determining that there is the invalid QoS flow description, performing an error handling operation to handle the invalid QoS flow description,
   wherein the error handling operation includes:
      when there is no default QoS rule associated with the QoS flow description of the GBR QoS flow which lacks at least one of the mandatory parameters, if a QoS rules Information Element (IE) of the NAS message contains at least one valid QoS rule, or a QoS flow description IE of the NAS message contains at least one other valid QoS flow description, further processing one or more requests corresponding to the at least one valid QoS rule, or the at least one other valid QoS flow description without diagnose an error to trigger a reject to the NAS message,
      completing a procedure for establishing or modifying the PDU session,
      deleting the QoS flow description which lacks at least one of the mandatory parameters and one or more QoS rules, if any, associated with the QoS flow description which lacks at least one of the mandatory parameters, and
      initiating a UE requested PDU session modification procedure by sending a PDU session modification request message with a 5G session management (5GSM) cause #84 syntactical error in the QoS operation to delete the QoS flow description which lacks at least one of the mandatory parameters and one or more QoS rules, if any, associated with the QoS flow description which lacks at least one of the mandatory parameters.

2. The method of claim 1, wherein the mandatory parameters include:
   guaranteed flow bit rate for uplink (GFBR UL),
   guaranteed flow bit rate for downlink (GFBR DL),
   maximum flow bit rate for uplink (MFBR UL), and
   maximum flow bit rate for downlink (MFBR DL).

3. The method of claim 1, wherein
   the QoS flow description is determined to be associated with the GBR QoS flow when a 5G QoS identifier (5QI) in the QoS flow description has a GBR resource type or a delay-critical GBR resource type, or when a QoS flow identifier (QFI) in the QoS flow description has a value of a 5QI having a GBR resource type or a delay-critical GBR resource type.

4. The method of claim 1, wherein the NAS message is a PDU session modification command message, or a PDU session establishment accept message.

5. The method of claim 1, wherein the error handling operation includes:
   when the invalid QoS flow description associated with the GBR QoS flow of the PDU session is associated with a default QoS rule of the PDU session, initiating a process to release the PDU session.

6. A method, comprising:
   receiving a protocol data unit (PDU) session modification command message from a core network requesting a flow description operation at a user equipment (UE) during a PDU session modification procedure;
   when the flow description operation is create a new Quality of Service (QoS) flow description, or modify existing QoS flow description, determining there is an invalid QoS flow description of a guaranteed bit rate (GBR) QoS flow upon determining that the QoS flow description of the GBR QoS flow lacks at least one of mandatory parameters; and upon determining that there is the invalid QoS flow description of the GBR QoS flow which lacks at least one of the mandatory parameters, performing an error handling operation to handle the invalid QoS flow description, wherein the error handling operation includes:
when there is no default QoS rule associated with the QoS flow description of the GBR QoS flow which lacks at least one of the mandatory parameters, if a QoS rules Information Element (IE) of the PDU session modification command message contains at least one valid QoS rule, or a QoS flow description IE of the PDU session modification command message contains at least one other valid QoS flow description, further processing one or more requests corresponding to the at least one valid QoS rule, or the at least one other valid QoS flow description without diagnose an error to trigger a reject to the PDU session modification command message,
completing the PDU session modification procedure,
deleting the QoS flow description which lacks at least one of the mandatory parameters and one or more QoS rules, if any, associated with the QoS flow description which lacks at least one of the mandatory parameters, and
initiating a UE requested PDU session modification procedure by sending a PDU session modification request message with a 5G session management (5GSM) cause #84 syntactical error in the QoS operation to delete the QoS flow description which lacks at least one of the mandatory parameters and one or more QoS rules, if any, associated with the QoS flow description which lacks at least one of the mandatory parameters.

7. The method of claim 6, wherein the mandatory parameters include:
guaranteed flow bit rate for uplink (GFBR UL),
guaranteed flow bit rate for downlink (GFBR DL),
maximum flow bit rate for uplink (MFBR UL), and
maximum flow bit rate for downlink (MFBR DL).

8. The method of claim 6, wherein the error handling operation includes:
when a default QoS rule of the PDU session is associated with the QoS flow description of the GBR QoS flow which lacks at least one of the mandatory parameters, initiating a PDU session release procedure by sending a PDU session release request message with the 5G session management (5GSM) cause #84, syntactical error in the QoS operation.

9. A method, comprising:
receiving a protocol data unit (PDU) session establishment accept message from a core network requesting a flow description operation at a user equipment (UE) during a PDU session establishment procedure requested by the UE;

when the flow description operation is create a new Quality of Service (QoS) flow description, determining there is an invalid QoS flow description of a guaranteed bit rate (GBR) QoS flow upon determining that the QoS flow description of the GBR QoS flow lacks at least one of mandatory parameters; and upon determining that there is the QoS flow description of the GBR QoS flow which lacks at least one of the mandatory parameters, performing an error handling operation to handle the invalid QoS flow description, wherein the error handling operation includes:
when a default QoS rule of the PDU session is associated with the QoS flow description of the GBR QoS flow which lacks at least one of the mandatory parameters, initiating a PDU session release procedure by sending a PDU session release request message with a 5G session management (5GSM) cause #84 syntactical error in the QoS operation,
when there is no default QoS rule associated with the QoS flow description of the GBR QoS flow which lacks at least one of the mandatory parameters, initiating a UE requested PDU session modification procedure by sending a PDU session modification request message with the 5G session management (5GSM) cause #84 syntactical error in the QoS operation to delete the QoS flow description which lacks at least one of the mandatory parameters and one or more QoS rules, if any, associated with the QoS flow description which lacks at least one of the mandatory parameters.

10. The method of claim 9, wherein the mandatory parameters include:
guaranteed flow bit rate for uplink (GFBR UL),
guaranteed flow bit rate for downlink (GFBR DL),
maximum flow bit rate for uplink (MFBR UL), and
maximum flow bit rate for downlink (MFBR DL).

11. The method of claim 9, wherein the error handling operation includes:
when there is no default QoS rule associated with the QoS flow description of the GBR QoS flow which lacks at least one of the mandatory parameters, if a QoS rules IE of the PDU session establishment accept message contains at least one valid QoS rule, or a QoS flow description IE of the PDU session contains at least one other valid QoS flow description, further processing one or more requests corresponding to the at least one valid QoS rule, or the at least one other valid QoS flow description.

12. The method of claim 9, wherein the error handling operation includes:
deleting the QoS flow description which lacks at least one of the mandatory parameters and one or more QoS rules, if any, associated with the QoS flow description which lacks at least one of the mandatory parameters.

* * * * *